United States Patent

Bingham

[11] Patent Number: 5,431,606
[45] Date of Patent: Jul. 11, 1995

[54] BALL WORM GEAR FINAL REAR AXLE DIFFERENTIAL DRIVE

[76] Inventor: David C. Bingham, 42332 Betley, Sterling Heights, Mich. 48313

[21] Appl. No.: 109,086

[22] Filed: Aug. 19, 1993

[51] Int. Cl.$^6$ .......................................... F16H 1/30
[52] U.S. Cl. ............................. 475/228; 475/229; 74/425
[58] Field of Search ............ 74/425, 665 F, 665 GD, 74/665 H; 192/49; 475/228, 229

[56] References Cited

U.S. PATENT DOCUMENTS

| | | | |
|---|---|---|---|
| 300,516 | 6/1884 | Settle | 74/42 |
| 688,266 | 12/1901 | Sandell | 475/228 |
| 864,845 | 9/1907 | Janson | 74/425 |
| 1,138,452 | 5/1915 | Casteran | 74/425 |
| 1,322,392 | 11/1919 | Atwood | 475/228 |
| 1,354,937 | 10/1920 | Alcorn | 475/228 |
| 1,378,723 | 5/1921 | Ross | 475/229 |
| 1,406,211 | 2/1922 | Myers | 475/228 |
| 1,464,077 | 8/1923 | Kennedy | 74/425 |
| 1,494,560 | 5/1924 | Moir et al. | 475/228 |
| 1,536,112 | 5/1925 | Lindgren | 475/228 |
| 1,600,738 | 9/1926 | Rockwell | 475/229 X |
| 1,704,861 | 3/1929 | Lewis | 475/228 |
| 1,982,768 | 12/1934 | Stevenson | 74/425 |
| 2,016,177 | 10/1935 | Ream | 475/228 X |
| 2,043,006 | 6/1936 | Morgan | 475/228 |
| 2,272,161 | 2/1942 | Frederickson | 475/229 |
| 2,343,469 | 3/1944 | Miller | 192/49 |
| 2,510,434 | 6/1950 | Toohey | 74/425 |
| 2,631,475 | 3/1953 | Gleasman | 475/229 |
| 2,714,935 | 8/1955 | Papp | 192/49 |
| 2,830,466 | 4/1958 | Myers | 475/223 |
| 2,888,114 | 5/1959 | Bostock | 192/49 |
| 3,875,824 | 4/1975 | Benjamin | 475/229 |
| 3,899,939 | 8/1975 | Hilado | 74/424.5 |
| 4,128,021 | 12/1978 | Knowles | 74/650 |
| 4,400,996 | 8/1983 | Schou | 74/650 |
| 4,567,783 | 2/1986 | Hart | 74/425 |
| 4,616,803 | 10/1986 | Schils | 251/14 |
| 4,630,497 | 12/1986 | Nelson | 74/425 |
| 4,651,586 | 3/1987 | Nemoto | 74/425 |
| 4,665,763 | 5/1987 | James | 74/425 |
| 4,739,671 | 4/1988 | Nelson | 74/425 |
| 4,791,831 | 12/1988 | Behnke et al. | 74/606 R |
| 4,833,934 | 5/1989 | Boyko et al. | 74/425 |
| 4,890,511 | 1/1990 | Pedersen | 475/229 |
| 4,926,712 | 5/1990 | Stritzel | 475/227 |

FOREIGN PATENT DOCUMENTS 175863 8/1935 Switzerland ............ 74/665 GD

*Primary Examiner*—Dirk Wright
*Assistant Examiner*—Khoi Q. Ta
*Attorney, Agent, or Firm*—Remy J. VanOphem; John VanOphem

[57] ABSTRACT

An automotive final drive assembly which utilizes a worm gear system for speed reduction between a vehicle's engine and drive wheels. The final drive assembly is capable of reducing the high speed from the engine and delivering it to the vehicle's drive wheels, all within an extremely compact space. Furthermore, the large contact area between the thread of the worm and the teeth of the worm gear provides for a high load capacity with relatively low friction, such that the final drive assembly is efficient and operates at lower temperatures. Finally, the worm gear is a ball worm gear having a spheroidal shape. As a result, the structure of the final drive assembly is simplified and suitably rigid to maintain the threads of the worm in mesh with the teeth of the worm gear.

15 Claims, 1 Drawing Sheet

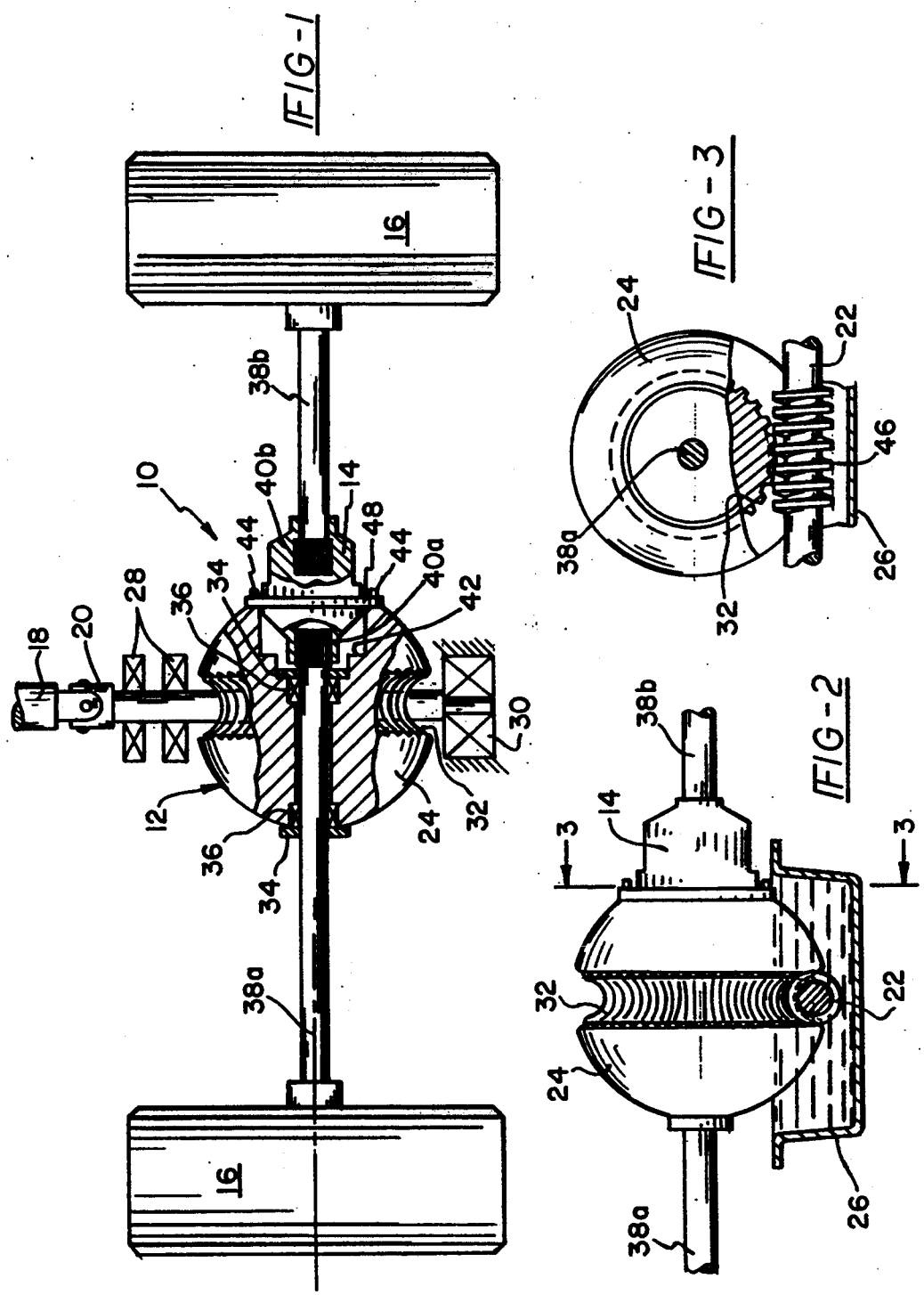

BALL WORM GEAR FINAL REAR AXLE DIFFERENTIAL DRIVE

BACKGROUND OF THE INVENTION

1. Field of the Invention

The present invention generally relates to automobile final drive assemblies for transferring engine power to the drive wheels of an automobile. More specifically, this invention relates to a rear axle differential drive assembly which utilizes a worm gear system consisting of an input worm and an output worm gear, with a differentiating clutch mounted adjacent of the output worm gear to provide differential operation of the rear wheels of the automobile.

2. Description of the Prior Art

Automobiles conventionally are equipped with a differential final drive to permit the drive wheels to rotate at different speeds. This capability is necessary when the vehicle is cornering, such that the outer drive wheel must cover a greater distance than the inner drive wheel. Generally, a conventional differential final drive includes a set of gears with three rotating members (one input and two outputs), each having a speed and torque relationship to the other. In a rear wheel drive, the first rotating member is an input gear driven by the drive shaft of the engine. The input gear drives a bevel ring gear having an axis of rotation generally perpendicular to that of the input gear. The bevel ring gear is formed on the perimeter of a differential case, which typically carries four pinions mounted to an X-shaped cross-shaft pinion pin mounted transverse to the axis of rotation of the bevel ring gear. The four pinions simultaneously mesh with a pair of bevel gears secured to two drive shafts, both of which are coaxial with the bevel ring gear's axis of rotation. One of the drive shafts extends through the bevel ring gear to the first drive wheel, while the second extends in an opposite direction to the second drive wheel.

On a straight course, the entire differential case rotates in unison, such that both drive wheels rotate at the same speed so as to maintain a 1:1 torque relationship between them. The pinion gears do not rotate on the cross-shaft pinion pin, but merely provide direct engagement between the bevel ring gear and the bevel gears on the drive shafts. However, during cornering, the pinions will rotate as necessary so as to permit the drive shaft coupled to the outer wheel to rotate faster than the drive shaft coupled to the inner wheel. In effect, the pinions serve to establish an equilibrium of torques and forces between the drive wheels.

While the above description covers the very basic operation of most differentials currently in production, other differential gear systems have been proposed. One such system is a worm and worm gear combination. Worm gears are a desirable alternative to the more conventional bevel gear/pinion arrangement in that they provide for a quieter and smoother gear reduction, with a large contact area between the worm thread and the worm gear teeth that promotes a high load capacity. Worm gear systems are also desirable in that they are capable of very large reduction ratios for a given center distance between shafts. Accordingly, worm gear systems can provide an extremely compact gear reduction capable of high speeds and torques. Compactness is a highly desirable feature in automotive applications where size, weight and ground clearance are important considerations.

Examples of worm gear differentials known in the prior art include U.S. Pat. No. 1,322,392 to Atwood, U.S. Pat. No. 1,536,112 to Lindgren, U.S. Pat. No. 1,704,861 to Lewis, U.S. Pat. No. 2,043,006 to Morgan and U.S. Pat. No. 4,128,021 to Knowles. Each of these prior art worm gear differentials generally teach the use of a worm which is driven by the vehicle's drive shaft. The worm meshes with a worm gear formed on a differential case. At least one, and more often both, of the wheel drive shafts are driven by the worm gear through a suitable mechanism that provides differential operation between the drive wheels. For example, the differential mechanism taught by Morgan is a more or less conventional differential bevel gear/pinion arrangement. However, as a result, the differential taught by Morgan is rather large and complicated in its construction due to the number of components required.

In contrast, Atwood, Lindgren, Lewis and Knowles teach the use of a slip clutch member mounted on at least one of a pair of drive axles for providing the desired differential operation of the drive wheels. Lindgren, Lewis and Knowles rely on engagement features formed on the clutch members which engage specially adapted surfaces of the worm gear, necessitating a worm gear which is structurally complicated in its design and construction. In contrast to the engagement features taught by Lindgren, Lewis and Knowles, Atwood teaches the use of a single frictional slip member which engages an annular recessed surface formed in the worm gear, which again results in a somewhat complicated worm gear form. The final rear drives taught by the above prior art are further complicated because the drive axles and the worm gears are maintained concentric with each other by independent bearing supports. Accordingly, the prior art differential mechanisms increase the overall size of the entire final drive assembly. As a result, the desirable compactness of a worm gear system is lost to some degree with worm gear differentials known in the prior art.

Furthermore, independent support of the worm gear and the drive axles results in a less rigid final drive assembly, in that the worm gear and the drive axles are supported by different sections of the differential housing and offer little, if any, structural support to each other. Rigidity and stiffness in a worm gear system is necessary to inhibit deflection and torsional displacement of the worm gear relative to the worm, particularly in view of the significant forces generated between the worm and worm gear which act to separate them.

Accordingly, what is needed is a compact automotive final drive assembly which incorporates a worm gear system for purposes of minimizing the size of the final drive assembly, so as to minimize weight and provide for maximum ground clearance, wherein the worm gear system utilizes an uncomplicated worm gear configuration which, in cooperation with the drive axles, enhances the structural rigidity of the final drive assembly.

SUMMARY OF THE INVENTION

According to the present invention there is provided an automotive final drive assembly which includes a worm gear system and a differential device for providing differential operation of the rear wheels of an automobile. The use of the worm gear system promotes compactness of the final drive assembly, as well as minimizes weight while maximizing ground clearance. The worm gear system includes a worm in mesh with a worm gear to deliver engine power from the engine drive shaft to the vehicle's drive axles. The worm gear is structurally uncomplicated, and does not require intricate machining to form surfaces which dynamically cooperate directly with the differential device. In addition, the manner in which the worm gear is assembled with the drive axles and the differential device promotes structural rigidity in the final drive assembly.

Conventionally, the final drive system includes an input member which delivers the engine power to the rear axle differential. According to the present invention, the worm serves as the input member and meshes with the worm gear, which serves as the final drive assembly's output. The worm and worm gear are appropriately sized to provide the proper speed reduction between the engine and the drive wheels. More specifically, the worm gear is a ball worm gear, having a generally spheroid shape with teeth formed in a groove on its perimeter, such that the ball worm gear generally consists of two lobes with gear teeth formed therebetween. The worm gear's axis of rotation is generally perpendicular to the worm's axis of rotation, so as to define the axis of rotation for the drive wheels.

The worm gear configuration generally creates a large tooth contact area. As a result of the spheroidal shape of the worm gear, the worm gear effectively wraps around the worm so as to optimize the number of gear teeth in mesh, thereby further increasing the contact area between the worm threads and the worm gear teeth so as to further enhance the load capacity of the worm gear system. Friction in the worm gear system is also generally reduced, such that the final drive assembly is more efficient and operates at lower temperatures.

According to a preferred aspect of this invention, the drive axles to the drive wheels are driven by the worm gear through a differentiating clutch mechanism which is not integrally formed within the worm gear, such that the configuration of the worm gear is not complicated by the differential capability of the final drive assembly. The drive axles are disposed on opposite sides of the worm gear, with one end being rotatably supported by the worm gear and/or the clutch mechanism, while the other end extends toward a respective drive wheel. The clutch mechanism is preferably mounted to the worm gear, and permits rotational slip between the worm gear and drive axles. As a result, once a predetermined torque level is exceeded, the clutch mechanism permits the drive wheels to rotate faster than the worm gear. For example, the outer drive wheel is able to be driven at a higher speed than the inner drive wheel while the vehicle is cornering.

In addition, a significant advantage of the present invention is that the drive axles and worm gear provide structural support to each other, so as to promote the rigidity of the final drive assembly. Such an arrangement also simplifies the structure of the final drive assembly. The worm and worm gear are enclosed, with or without the clutch mechanism, within a suitable housing containing a sufficient quantity of lubricant. As a result of the compact and uncomplicated worm gear system of this invention, the housing is also very compact, which enables the vehicle to have a large ground clearance. Furthermore, the compactness of the system corresponds to low weight, which is also highly desirable in terms of the vehicle's fuel efficiency.

Accordingly, it is an object of the present invention to provide an automotive final drive assembly which has a compact, uncomplicated structure, so as to promote low weight and ground clearance of the final drive assembly.

It is a further object of the invention that the final drive assembly utilize a worm gear system for reducing and transferring the rotational input of a vehicle's engine to the vehicle's drive wheels.

It is still a further object of the invention that the worm gear system include a ball worm gear driven by an input worm, wherein the ball worm gear has gear teeth formed on its perimeter and two drive axles which are directly or indirectly supported by the ball worm gear.

It is another object of the invention that the final drive assembly include a clutch mechanism engaged with each of the drive axles so as to permit differential operation of the drive wheels during cornering.

Other objects and advantages of this invention will be more apparent after a reading of the following detailed description taken in conjunction with the drawings provided.

BRIEF DESCRIPTION OF THE DRAWINGS

FIG. 1 is a plan view of an automobile final drive assembly in accordance with the preferred embodiment of this invention;

FIG. 2 is a rear view of the automobile final drive assembly of FIG. 1; and

FIG. 3 is a side view in partial cross section of the automobile final drive assembly taken along line 3—3 of FIG. 2.

DETAILED DESCRIPTION OF THE PREFERRED EMBODIMENT

With reference to FIGS. 1, 2 and 3, there is shown an automobile final drive axle assembly 10 in accordance with this invention. As illustrated, the final drive axle assembly 10 includes a worm gear system 12 and a clutch 14 located between the rear wheels 16 of a vehicle (not shown). In a conventional manner, a drive shaft 18 from the engine (not shown) is coupled to the worm gear system 12 with a universal joint 20. The universal joint 20 drives a worm 22, which serves as the input member to the worm gear system 12. Threads 46 formed on the worm 22 are enclosed within a housing 26, conventionally referred to as a differential carrier, and mesh with gear teeth 32 formed on a ball worm gear 24 rotatably supported along the axis of rotation of the rear wheels 16.

As best seen in FIG. 2, the worm 22 is preferably located vertically beneath the ball worm gear 24 within the housing 26 so as to be completely immersed in a suitable lubricant. The worm 22 is supported by two roller type thrust bearings 28 located on the side of the worm gear system 12 adjacent the drive shaft 18, and by an additional roller type thrust bearing 30 which is mounted on the side of the worm gear system 12 opposite the drive shaft 18. The ball worm gear 24 can be rotatably supported by the housing 26 in a manner (not shown) which is conventional for final axle drives known in the art. Bearing support of the worm 22 and ball worm gear 24 is particularly important to promote stiffness of the worm gear system 12, so as to inhibit deflection and torsional displacement. These characteristics are particularly important in that worm gears generate significant lateral forces which act to separate the worm 22 from the ball worm gear 24.

The ball worm gear 24, as the term is defined and used herein, generally has a spheroidal shape, with the gear teeth 32 formed on its perimeter such that, as best seen in FIG. 2, the ball worm gear 24 generally consists of two lobes with the gear teeth 32 formed therebetween. In effect, the ball worm gear 24 wraps around the worm 22 so as to put more gear teeth 32 in mesh with the threads 46. As noted previously, the large contact area with worm gear systems is desirable in that it provides for a high load capacity. In addition, friction is generally reduced, such that the worm gear system 12 is more efficient and operates at lower temperatures.

The shape of the ball worm gear 24 lends itself to being manufactured by powder metallurgy techniques, such that only final grinding of the gear teeth 32 is necessary. The ball worm gear 24 can be formed from known iron-base powder metallurgy materials, while the worm 22 can be conventionally manufactured from iron-base alloys. The diameter of the ball worm gear 24 is determined in part by the speed reduction required of the final drive axle assembly 10 and in part by the centrifugal force generated by the mass of the spinning ball worm configuration. The centrifugal force of the ball worm gear aids in the power transfer since the mass of the ball worm gear helps to increase the torque leverage as the mechanism spins faster and faster. The speed reduction capability of the final drive axle assembly 10 is determined by the ratio between the number of gear teeth 32 on the ball worm gear 24 and the number of threads 46 on the worm 22. Accordingly, the desired number of threads 46 and gear teeth 32 on the worm 22 and ball worm gear 24, respectively, must be calculated for a particular application, based upon available engine speed, tire diameter, etc. Typically, the final drive ratio will roughly be on the order of between about 1:2 to 1:5 for automobiles.

For purposes of providing a compact final drive axle assembly 10, a pair of drive axles 38a and 38b are provided, the drive axle 38a being supported by a pair of bearings 36 mounted directly to the ball worm gear 24, without any intermediate drive assembly members. The drive axles 38a and 38b extend axially away from the ball worm gear 24. Each drive axle 38a and 38b extends from the ball worm gear 24 toward a corresponding rear wheel 16 through an axle housing (not shown). The drive axle 38a can be secured to the ball worm gear 24 in a conventional manner, such as with a pair of snap rings (not shown).

In accordance with this invention, the drive axles 38a and 38b are coupled to the clutch 14 via a corresponding pair of drive splines 40a and 40b. Outboard from the clutch 14, the drive axles 38a and 38b are connected to the rear wheels 16 in a conventional manner. The clutch 14 is preferably provided with a mounting flange 48, so as to permit the clutch 14 to be secured with mounting bolts 44 directly to the ball worm gear 24. In this embodiment, the clutch 14 can be housed separately or enclosed within the housing 26. As shown, a portion of the clutch 14 is preferably received within a recess 42 formed in the ball worm gear 24, so as to minimize the size of the worm gear system 12 and thereby facilitate its enclosure within the housing 26.

The clutch 14 serves as a torque limiter to automatically permit rotational slippage between the ball worm gear 24 and the rear wheels 16 at a predetermined torque level. Once the predetermined torque level is exceeded, the clutch 14 will permit the appropriate drive wheel 16 to rotate at a speed different from that of the ball worm gear 24. The most common example for such an occurrence is while the vehicle is cornering, when the outer drive wheel 16 is required to be rotated at a higher speed than the inner drive wheel 16.

The clutch 14 is preferably a differentiating clutch. Though various forms of differentiating clutches are known to those skilled in the art, a particularly suitable differentiating clutch is commercially available under the trademark TRUE TRAC from Dyneer, Inc. This particular clutch is a gear-type clutch composed of several worm gears (not shown) which are in mesh with worms (not shown) driven by the drive axles 38a and 38b. Such clutches are well known to those skilled in the art and will not be described further. However, the present invention is not to be limited by the particular type of clutch used, in that various other types of clutches, such as friction clutches, could also be used. Importantly, the preferred gear-type clutch offers durability and torque capacity on the level which is believed to be more suitable for the present application.

A significant advantage of the final drive axle assembly 10 of this invention is that the ball worm gear 24 does not itself serve as a clutch member for providing the differential capability of the final drive axle assembly 10. As a result, the configuration of the ball worm gear 24 is relatively uncomplicated, and can be more readily utilized as a structural component of the final drive axle assembly. In particular, the ends of the drive axles 38a and 38b are directly or indirectly supported by the ball worm gear 24, such that no additional bearing support of the drive axles 38a and 38b is required of the housing 26. Furthermore, rigidity of the worm gear system 12 is also promoted because the ball worm gear 24, the clutch 14, and the drive axles 38a and 38b are able to provide structural support to each other.

Another significant advantage of the present invention is that, because the worm 22 and ball worm gear 24 are compact and are unencumbered by additional gear reduction components, the housing 26 enclosing them can also be extremely compact, which enables a vehicle utilizing the final drive axle assembly 10 of this invention to have a large ground clearance. The compactness of the final drive axle assembly 10 corresponds to low weight, which is also highly desirable in terms of fuel economy.

Accordingly, the present invention provides an automotive rear axle differential which utilizes a worm gear system as the speed reduction system between the engine and the vehicle's drive wheels. The present invention is capable of reducing the high speed delivered by the engine and transferring this motion to the vehicle's drive wheels, all within a very compact space. Furthermore, the large contact area between the thread of the worm and the teeth of the worm gear provides for a high load capacity with relatively low friction, such that the final drive axle assembly is efficient and operates at lower temperatures.

While the invention has been described in terms of a preferred embodiment, it is apparent that other forms could be adopted by one skilled in the art. For example, the final drive axle assembly 10 could be adapted by one skilled in the art for use on a front wheel drive vehicle. Accordingly, the scope of the invention is to be limited only by the following claims.

What is claimed is:

1. An automotive final drive for driving a pair of wheels, said automotive final drive comprising:
   an input worm;
   a ball worm gear in mesh with said input worm;
   a pair of axles interconnected with said ball worm gear, said pair of axles being disposed on opposite sides of said ball worm gear; and
   means mounted to said ball worm gear for permitting rotational speed differentiation between said pair of axles and said pair of wheels.

2. The automotive final drive of claim 1 wherein said input worm has an axis of rotation which lies in a plane that is perpendicular to a plane in which lies an axis of rotation of said ball worm gear.

3. The automotive final drive of claim 1 wherein said ball worm gear is spheroidal in shade and comprises two lobes and a plurality of gear teeth formed between said two lobes.

4. The automotive final drive of claim 1 wherein said differentiation means is a clutch mounted to said ball worm gear.

5. The automotive final drive of claim 1 wherein said input worm is mounted vertically below said ball worm gear.

6. An automotive rear axle differential for transferring rotational speed and torque from an engine to a pair of rear wheels, said automotive rear axle differential comprising:
   a housing;
   an input worm projecting into said housing, said input worm having an input axis of rotation;
   an output ball worm gear enclosed within said housing, said output ball worm gear being in mesh with said input worm, said output ball worm gear having an output axis of rotation which lies in a plane that is perpendicular to a plane in which lies said input axis of rotation;
   means mounted to said output ball worm gear for permitting rotational speed differentiation between said output ball worm gear and said pair of rear wheels; and
   a pair of axles supported by and secured to said differentiation means, said pair of axles being disposed on opposite sides of said output ball worm gear.

7. The automotive rear axle differential of claim 6 wherein said input worm is driven by said engine.

8. The automotive rear axle differential of claim 6 wherein said output ball worm gear comprises two lobes and a plurality of gear teeth formed between said two lobes.

9. The automotive rear axle differential of claim 6 wherein said differentiation means is a clutch mounted to said output ball worm gear.

10. The automotive rear axle differential of claim 6 wherein each axle of said pair of axles drives a corresponding wheel of said pair of rear wheels.

11. The automotive rear axle differential of claim 6 wherein said input worm is mounted vertically below said output ball worm gear.

12. The automotive rear axle differential of claim 6 wherein said input worm transfers rotational motion from said engine to said pair of axles, said pair of axles being disposed in a plane that is perpendicular to said plane in which lies said input axis of rotation.

13. The automotive rear axle differential of claim 6 wherein said differentiation means are located between said output ball worm gear and one of said pair of rear wheels.

14. The automotive rear axle differential of claim 13 wherein said differentiation means is enclosed within said housing.

15. An automotive rear axle differential for transferring rotational speed and torque from an engine to a pair of rear wheels, said automotive rear axle differential comprising:
   an input worm driven by said engine, said input worm having an input axis of rotation;
   an output ball worm gear in mesh with said input worm, said output ball worm gear comprising two lobes and a plurality of gear teeth, said plurality of gear teeth being formed on a circumference of said output ball worm gear between said two lobes, said plurality of gear teeth meshing with said input worm, said output ball worm gear having an output axis of rotation which lies in a plane that is perpendicular to a plane in which lies said input axis of rotation;
   a gear-type differentiating clutch mounted to said output ball worm gear, said gear-type differentiating clutch permitting rotational slip between said output ball worm gear and said pair of rear wheels;
   a pair of axles secured directly to said gear-type differentiating clutch, said pair of axles being disposed on opposite sides of said output ball worm gear, said pair of axles extending along said output axis of rotation; and
   means associated with said gear-type differentiating clutch for driving a corresponding one of said pair of rear wheels.

* * * * *

UNITED STATES PATENT AND TRADEMARK OFFICE
CERTIFICATE OF CORRECTION

PATENT NO. : 5,431,606
DATED : July 11, 1995
INVENTOR(S) : David C. Bingham

It is certified that error appears in the above-indentified patent and that said Letters Patent is hereby corrected as shown below:

Column 7, line 16, delete "shade" insert ---- shape ----.

Signed and Sealed this

Tenth Day of October, 1995

Attest:

BRUCE LEHMAN

Attesting Officer     Commissioner of Patents and Trademarks